(12) United States Patent
Grimm

(10) Patent No.: US 10,215,271 B2
(45) Date of Patent: Feb. 26, 2019

(54) PLANETARY GEAR

(75) Inventor: Andreas Grimm, Stutensee (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 1184 days.

(21) Appl. No.: 13/139,958

(22) PCT Filed: Dec. 9, 2009

(86) PCT No.: PCT/EP2009/008783
§ 371 (c)(1),
(2), (4) Date: Jun. 15, 2011

(87) PCT Pub. No.: WO2010/072331
PCT Pub. Date: Jul. 1, 2010

(65) Prior Publication Data
US 2011/0251010 A1 Oct. 13, 2011

(30) Foreign Application Priority Data

Sep. 24, 2009 (DE) .................. 10 2009 042 591
Dec. 15, 2018 (DE) .................. 10 2008 061 903

(51) Int. Cl.
| | | |
|---|---|---|
| *F16H 57/04* | (2010.01) | |
| *F16C 17/04* | (2006.01) | |
| *F16C 33/10* | (2006.01) | |
| *F16H 57/08* | (2006.01) | |
| *F16C 17/18* | (2006.01) | |
| *F16H 1/46* | (2006.01) | |

(52) U.S. Cl.
CPC ......... *F16H 57/043* (2013.01); *F16C 17/047* (2013.01); *F16C 17/18* (2013.01); *F16C 33/1075* (2013.01); *F16H 57/08* (2013.01); *F16H 1/46* (2013.01)

(58) Field of Classification Search
CPC .. F16C 17/047; F16C 33/1075; F16C 17/045; F16C 17/042; F16C 33/107; F16C 17/18; F16H 57/043; F16H 57/08; F16H 1/46
USPC ................................................. 475/337, 159
See application file for complete search history.

(56) References Cited

U.S. PATENT DOCUMENTS

| | | | |
|---|---|---|---|
| 2,357,561 A * | 9/1944 | Tatlow | ........................ 475/337 |
| 2,492,041 A * | 12/1949 | Heise | ..................... F16N 31/00 |
| | | | 123/179.22 |
| 2,505,002 A * | 4/1950 | Orr | .............................. 475/332 |
| 3,906,818 A | 9/1975 | Benthake et al. | |

(Continued)

FOREIGN PATENT DOCUMENTS

| | | |
|---|---|---|
| DE | 23 05 780 | 8/1974 |
| DE | 33 30 337 | 3/1985 |

(Continued)

OTHER PUBLICATIONS

Machine translation of DE 295 20 946; retrieved from Google Translate on Mar. 27, 2015.*

(Continued)

*Primary Examiner* — Stacey A Fluhart
(74) *Attorney, Agent, or Firm* — Hunton Andrews Kurth LLP

(57) ABSTRACT

A planetary gear, in particular a multi-stage planetary gear, includes at least two sun wheels, which are disposed coaxially one behind the other. A hydrodynamic axial bearing is arranged between the sun wheels.

23 Claims, 8 Drawing Sheets

(56) References Cited

U.S. PATENT DOCUMENTS

| | | | |
|---|---|---|---|
| 4,237,750 A | | 12/1980 | Takahashi |
| 4,437,530 A | | 3/1984 | De Young et al. |
| 4,920,828 A | * | 5/1990 | Kameda et al. ............. 475/299 |
| 5,624,344 A | * | 4/1997 | Yehl et al. .................... 475/160 |
| 5,735,765 A | * | 4/1998 | Teraoka et al. ............... 475/248 |
| 5,779,588 A | * | 7/1998 | Mann et al. .................. 475/331 |
| 2004/0259677 A1 | * | 12/2004 | Shirokoshi ................... 475/330 |

FOREIGN PATENT DOCUMENTS

| | | | | |
|---|---|---|---|---|
| DE | 81 29 456 | | 3/1986 | |
| DE | 295 20 946 | | 6/1996 | |
| DE | 198 53 459 | | 6/2000 | |
| DE | 100 43 564 | | 3/2002 | |
| FR | 660 902 | | 7/1929 | |
| GB | 1014598 A | * | 12/1965 | ............. F16C 17/04 |
| GB | 2 146 932 | | 5/1985 | |
| JP | 57083747 A | * | 5/1982 | |

OTHER PUBLICATIONS

International Search Report, issued in corresponding International Application No. PCT/EP2009/008783.
Written Opinion, issued in corresponding International Application No. PCT/EP2009/008783.

* cited by examiner

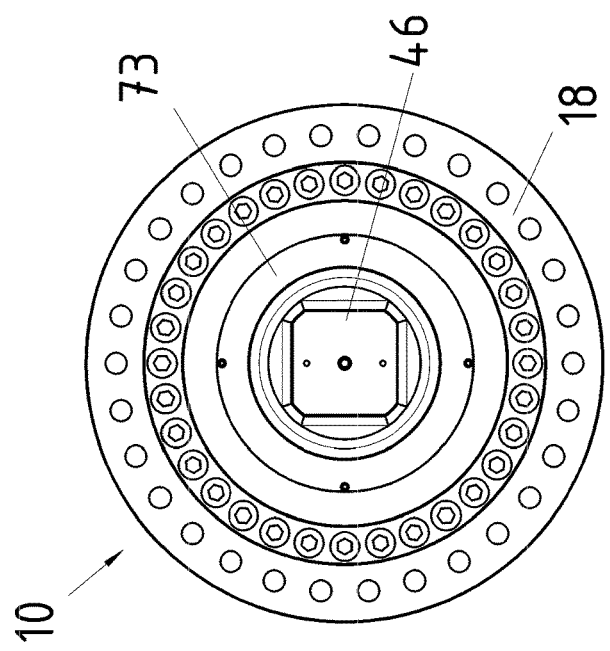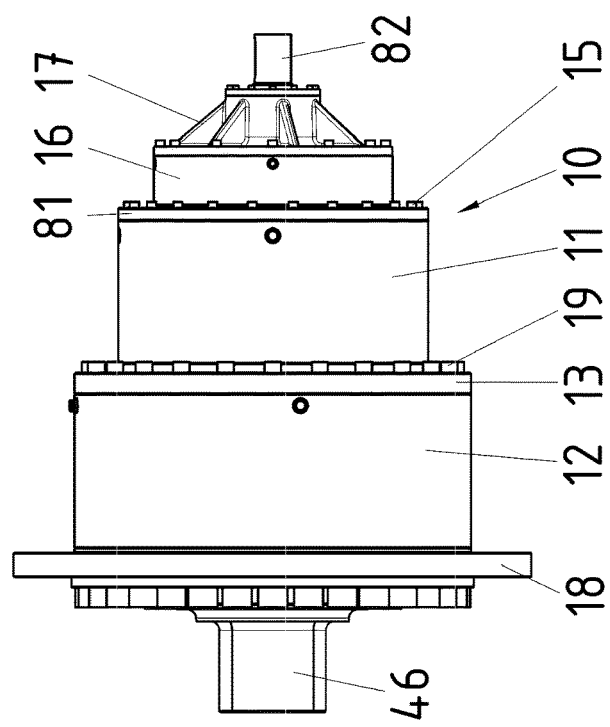
Fig. 5

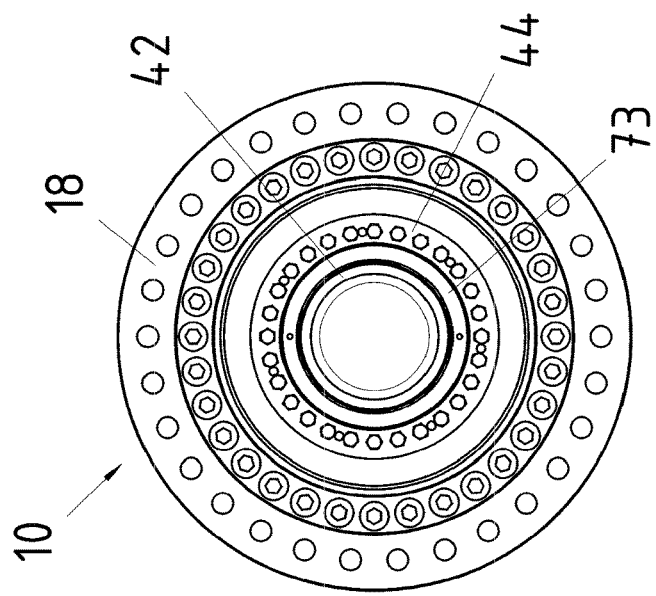
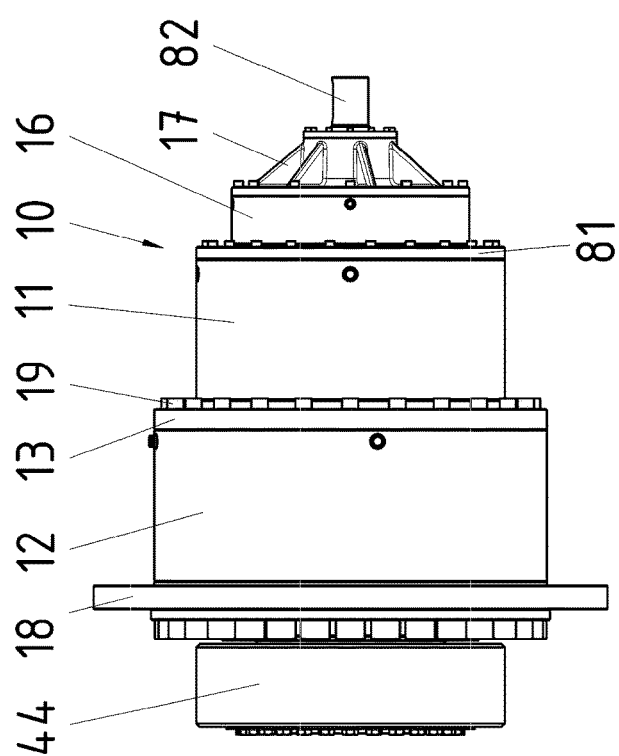

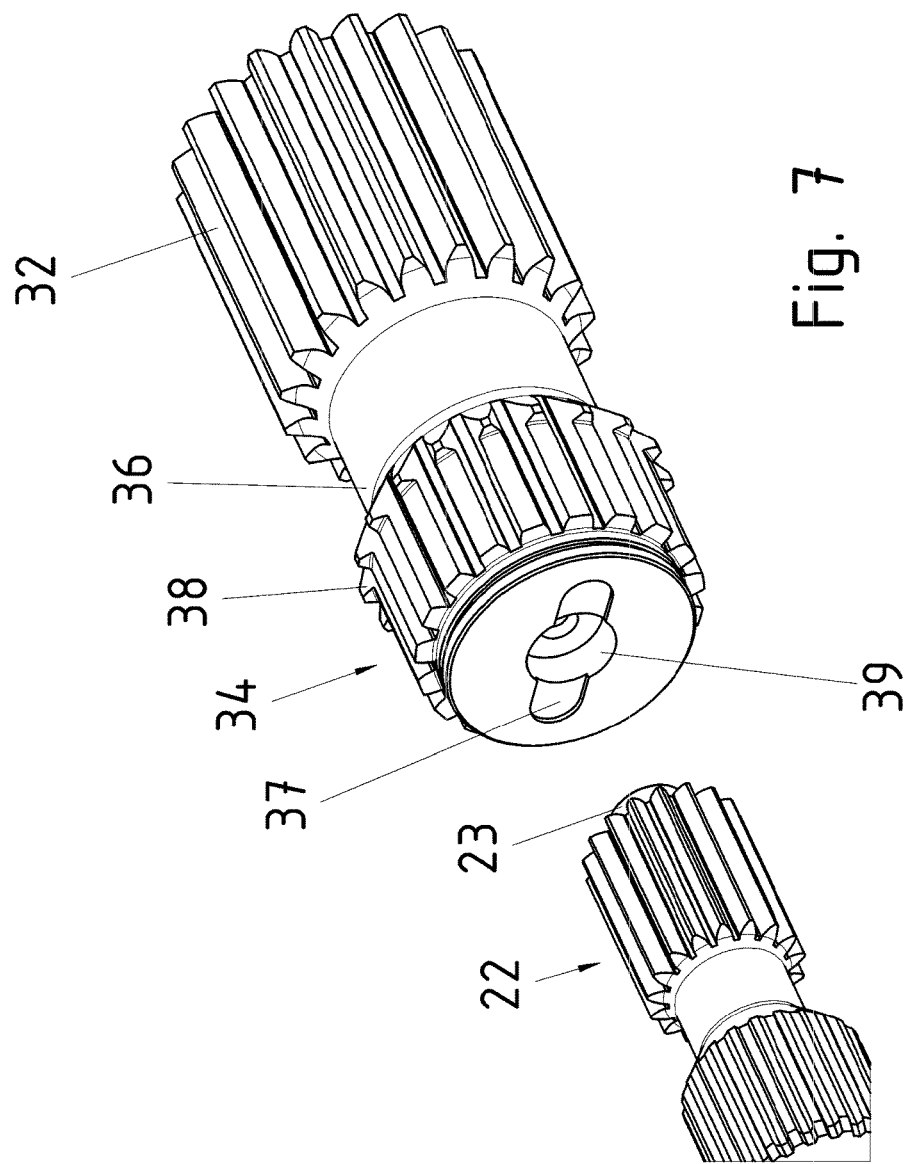

PLANETARY GEAR

FIELD OF THE INVENTION

The present invention relates to a planetary gear.

BACKGROUND INFORMATION

DE 23 05 780 describes a multi-stage planetary gear, in which the planet wheels are held on the pins of the planet carriers and the individual stages are held against one another by a slide ring system.

DE 198 53 459 describes a multi-stage planetary gear, in which a single internal gear is provided with a single inner toothing, with which all planet carriers mate.

DE 33 30 337 describes a power turning device, which has a housing part, in which a single-stage or multi-stage main gear is located. At the input side of the housing part, a housing part is fastened in a detachable manner, which contains an additional gear stage.

U.S. Pat. No. 4,437,530 describes an axle drive device for driving vehicle wheel devices, which includes a differential mechanism for driving axle shafts.

SUMMARY

According to example embodiments of the present invention, the planetary gear includes at least two sun wheels, which are disposed coaxially one behind the other, a hydrodynamic axial bearing being arranged between the sun wheels. An advantage in this regard is that axial forces that may act on the sun wheels, for example the weight of the sun wheels themselves, are absorbed and a wear is reduced.

In example embodiments, the hydrodynamic axial bearing is arranged between two mutually facing end faces of the sun wheels. It is advantageous in this regard that no additional components are required.

In example embodiments, for forming the hydrodynamic axial bearing, a first of the sun wheels has a first recess in its end face, which in the circumferential direction partially extends further radially than the end face of a second of the sun wheels. It is advantageous in this regard that the sections of the end faces, which form the hydrodynamic axial bearing, are well supplied with lubricant.

In example embodiments, the first recess is situated concentrically to the axle of the first sun wheel and is preferably arranged to have an oval shape. It is advantageous in this regard that the first recess is simple to produce and the hydrodynamic axial bearing is supplied with lubricant or is arranged in a uniformly symmetrical manner.

In example embodiments, a centrally disposed pin projects beyond the end face of the second sun wheel, which is situated at least partially in another recess of the end face of the first sun wheel. It is advantageous in this regard that the production of the second sun wheel is simplified since the pin is also usable as a holding device for a tool in the manufacture. At the same time, bank-up steps are formed for the hydrodynamic axial bearing, which ensure a good lubricant supply and ensure that the lubricant remains between the regions of the end faces that form the hydrodynamic axial bearing.

In example embodiments, the additional recess is arranged concentrically to the axis of the first sun wheel and in a circular manner, the additional recess extending axially deeper into the first sun wheel than the first recess. It is advantageous in this regard that the additional recess is suitable for receiving the pin. At the same time, the additional recess is suitable as a lubricant reservoir for the hydrodynamic axial bearing.

In example embodiments, a level of an oil, with which the planetary gear is at least partially filled, touches at least the first recess or the first recess is at least immersed in the lubricant, in particular oil. It is advantageous in this regard that the hydrodynamic axial bearing is provided reliably out of a position of rest of the planetary gear.

In example embodiments, centering bores and/or tool receptacles are produced in the end faces of the sun wheels. It is advantageous in this regard that the sun wheels are readily handled in the manufacture. Furthermore, the centering bores act as a lubricant reservoir for the hydrodynamic axial bearing.

In example embodiments, a distance between a front surface of the pin and a bottom surface of the additional recess is greater than the distance between the mutually facing end faces. It is advantageous in this regard that the hydrodynamic axial bearing is well-defined, i.e. is not overdetermined in its position, and that a lubricant reservoir, in particular an oil reservoir, is formed for the hydrodynamic axial bearing.

In example embodiments, the sun wheels are supported in an axially floating manner. It is advantageous in this regard that the sun wheels are simple to mount and that the hydrodynamic axial bearing is arranged differently depending on a rotational speed difference of the sun wheels.

In example embodiments, an input-side end region of one of the sun wheels, in particular the second sun wheel, is connected with a corresponding end region of an input shaft or of a planet carrier of a preceding planetary stage in a rotationally fixed, preferably form-locking manner. It is advantageous in this regard that a torque is securely transmittable and that axial forces on the input shaft or the planet carrier of a preceding planetary stage are absorbed by the hydrodynamic axial bearing.

In example embodiments, the planetary gear has a first and a second stage, a first sun wheel engaging with an end region as an engaging piece into a planet carrier of the first stage, the first sun wheel having a continuous toothing in the axial direction. It is advantageous in this regard that the planetary gear is simple to manufacture.

In example embodiments, the first sun wheel has a central region, where the continuously manufactured toothing is interrupted. It is advantageous in this regard that a two-cheeked planet carrier is producible with greater strength.

In example embodiments, the end region has in a subregion a shortened crown circle, which produces an axial stop. It is advantageous in this regard that the first sun wheel is disposed in a well-defined manner with respect to the planet carrier of the first stage. Axial forces are transmittable onto the first sun wheel at least in one direction.

In example embodiments, the second stage is arranged as an output stage, a two-cheeked planet carrier of the output stage being provided on the output side as a hollow shaft, which preferably encloses a shrink disk, or as a solid shaft, particularly as a solid square shaft. It is advantageous in this regard that a torque is securely transmittable.

In example embodiments, an intermediate flange is arranged as a cast part, on which a first internal gear for the first stage and a second internal gear for the second stage are flange-mounted. It is advantageous in this regard that the intermediate flange is producible in a stable and cost-effective manner.

In example embodiments, an input stage is disposed in front of the first stage when viewed from the input side. It is advantageous in this regard that a greater transmission ratio range is realizable in a variable manner using the input stage as the zeroth stage of the planetary gear.

In example embodiments, the second sun wheel engages as a sun wheel of the first stage in an input-side end region with a multiple spline toothing into a planet carrier of the input stage. It is advantageous in this regard that the torque is securely transmittable from the input stage into the first stage.

In example embodiments, the input stage and the first stage each have three planet wheels. It is advantageous in this regard that a torque is securely transmittable.

In example embodiments, the second stage has four planet wheels. It is advantageous in this regard that a greater torque is transmittable or that the wear is reduced.

In example embodiments, an input cover has a central cylinder jacket-shaped bearing carrier and a circular shield part enclosing the bearing carrier, the shield part being reinforced by triangular parts projecting radially from the bearing carrier, and the triangular parts being supported on the bearing carrier. It is advantageous in this regard that radial forces may be safely dissipated.

In example embodiments, an equal-sided triangular input planet carrier is produced as a cast part together with planet bolts for bearing the input planet wheels of the input stage, the planet bolts being manufacturable from the cast part in varying radial distances to a central a axis of the planetary gear. It is advantageous in this regard that varying transmission ratios are implementable in a simple manner.

In example embodiments, the planet carriers of the first and second stage are cast as one piece, receiving holes for the bolts or additional bolts for the planet wheels being producible at different radial distances to a central axis of the planetary gear. It is advantageous in this regard that varying transmission ratios are implementable in a simple manner.

In example embodiments, a housing of the planetary gear includes an input-side cover, an input internal gear, an input flange, a first internal gear, an intermediate flange, a second internal gear and an output cover, the input flange, the intermediate flange and the output cover each being produced from one cast part or forged part. It is advantageous in this regard that the housing of the planetary gear may be manufactured in a simple and cost-effective manner.

Further advantages, features, and aspects are described below. The present invention is not limited to the feature combination described below. For one skilled in the art, additional combination options and/or individual features and/or features of the specification and/or the figures are possible.

LIST OF REFERENCE NUMERALS 10 planetary gear
11 first internal gear
12 second internal gear
13 intermediate flange
14 bore in the end wall
15 screw
16 input internal gear
17 input cover
18 output cover
19 additional screw
20 first stage
22 second sun wheel
23 pin
24 bolt
26 planet carrier of the first stage
27 planet wheel
28 planet wheel bearing
30 second stage
32 first sun wheel
33 sun wheel bearing
34 end region
35 subregion
36 central region
37 first recess
38 axial stop
39 additional recess
40 two-cheeked planet carrier
41 additional planet wheel
42 hollow shaft
43 planet carrier bearing
44 shrink disk
45 output bearing
46 solid shaft
47 bolt bearing
49 additional bolt
70 shaft sealing ring
71 race
7 air vent
73 sheet metal part
74 screw plug
80 input stage
81 input flange
82 input shaft
84 input shaft bearing
86 cap
90 input planet carrier
91 input sun wheel
92 input planet wheel
94 planet bearing
96 planet bolt Example embodiments of the present invention are explained in greater detail below with reference to the Figures.

BRIEF DESCRIPTION OF THE DRAWINGS

FIG. 5 is a front view and a side view of the example embodiment shown in FIG. 4.

FIG. 6 is a front view and a side view of a modified example embodiment.

FIG. 7 illustrates two sun wheels of the planetary gear according to an example embodiment of the present invention in an exploded view.

DETAILED DESCRIPTION

Figure 1:
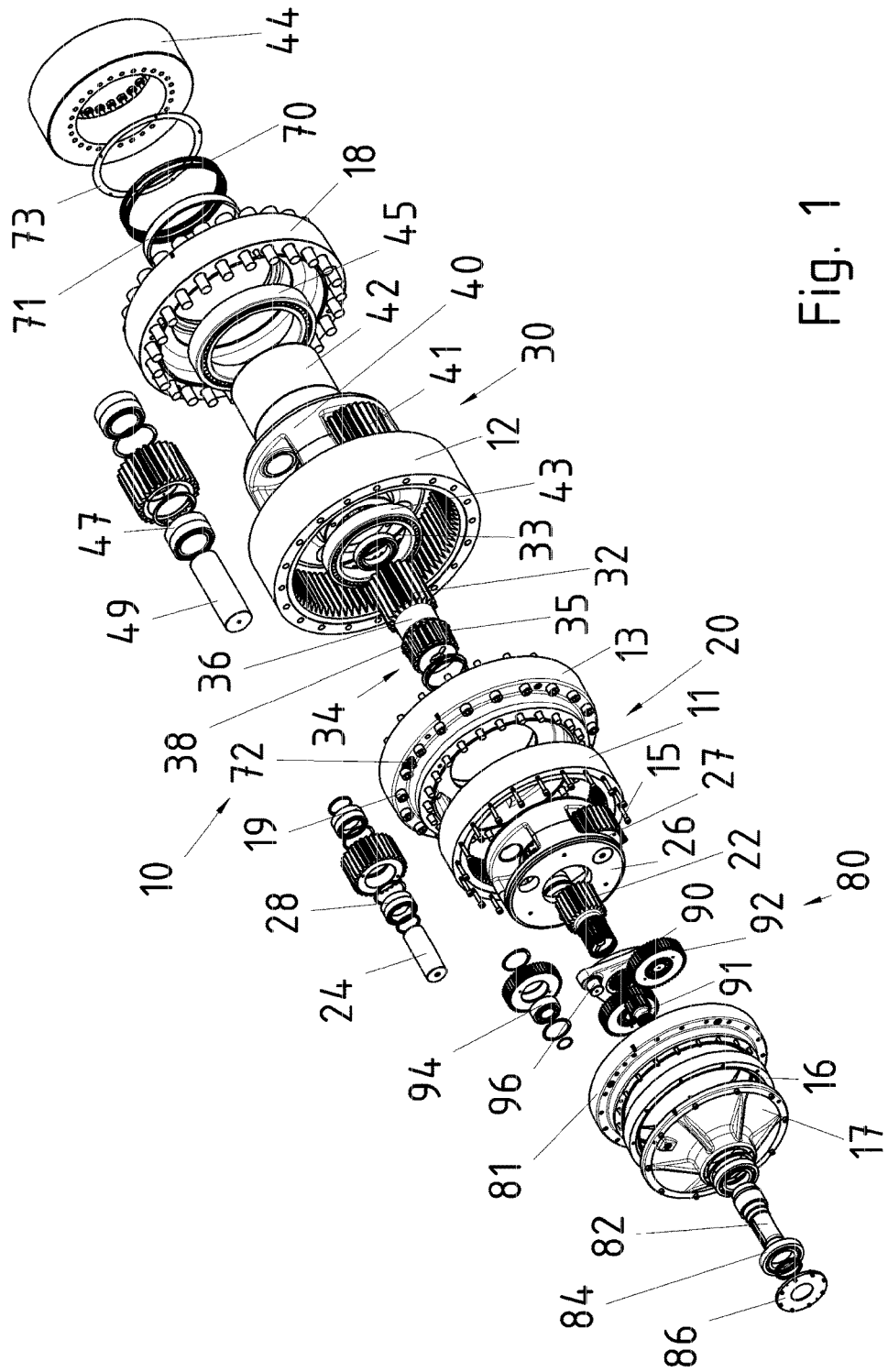
FIG. 1 is an exploded view of a planetary gear according to an example embodiment of the present invention.

FIG. 1 shows a planetary gear 10 according to an example embodiment of the present invention in an exploded view. Planetary gear 10 comprises three stages: a zeroth stage as input stage 80, a first stage 20, which functions as an alternative input stage if the zeroth stage is not present, and a second stage 30 as output stage.

A housing of planetary gear 10 includes an input-side cover 17, on which an input internal gear 16 is fastened. On its output side, an input flange 81 is screwed on input internal gear 16. On its output side, the input flange is followed by a first internal gear 11, which is fastened by a screw 15 on an intermediate flange 13. Intermediate flange 13 forms the connection from a second internal gear 12 to first internal gear 11.

Second internal gear 12 is screwed to intermediate flange 13 by another screw 19. On its output side, second internal gear 12 is followed by an output cover 18, which closes off the housing of planetary gear 10 on the output side. An air vent 72 and a screw plug 74 are situated on the housing. The air vent is used for pressure equalization when an interior of planetary gear 10 heats up. The opening in the housing of planetary gear 10, which is closed by screw plug 74, is used for pouring in or exchanging a lubricant, preferably oil, of planetary gear 10.

Figure 2:
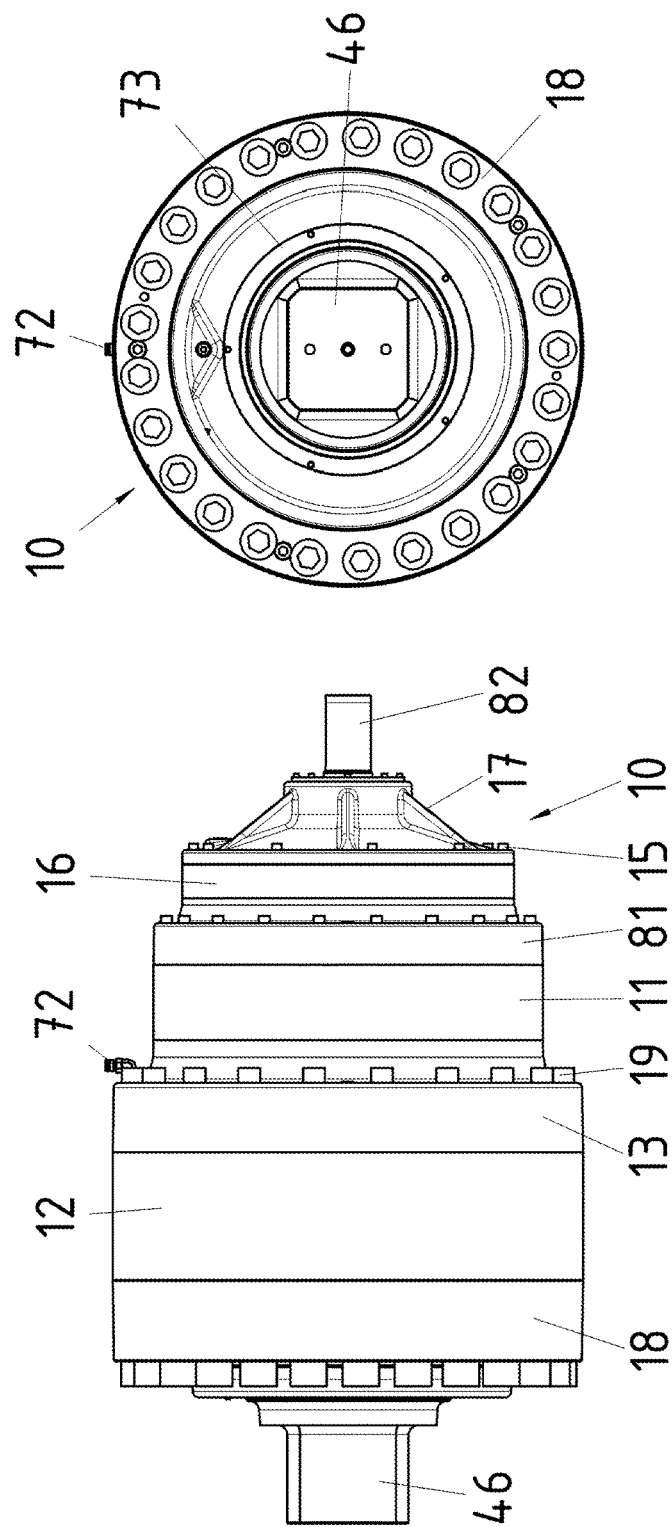
FIG. 2 is a front view and a side view of the example embodiment shown in FIG. 1.
Figure 3:
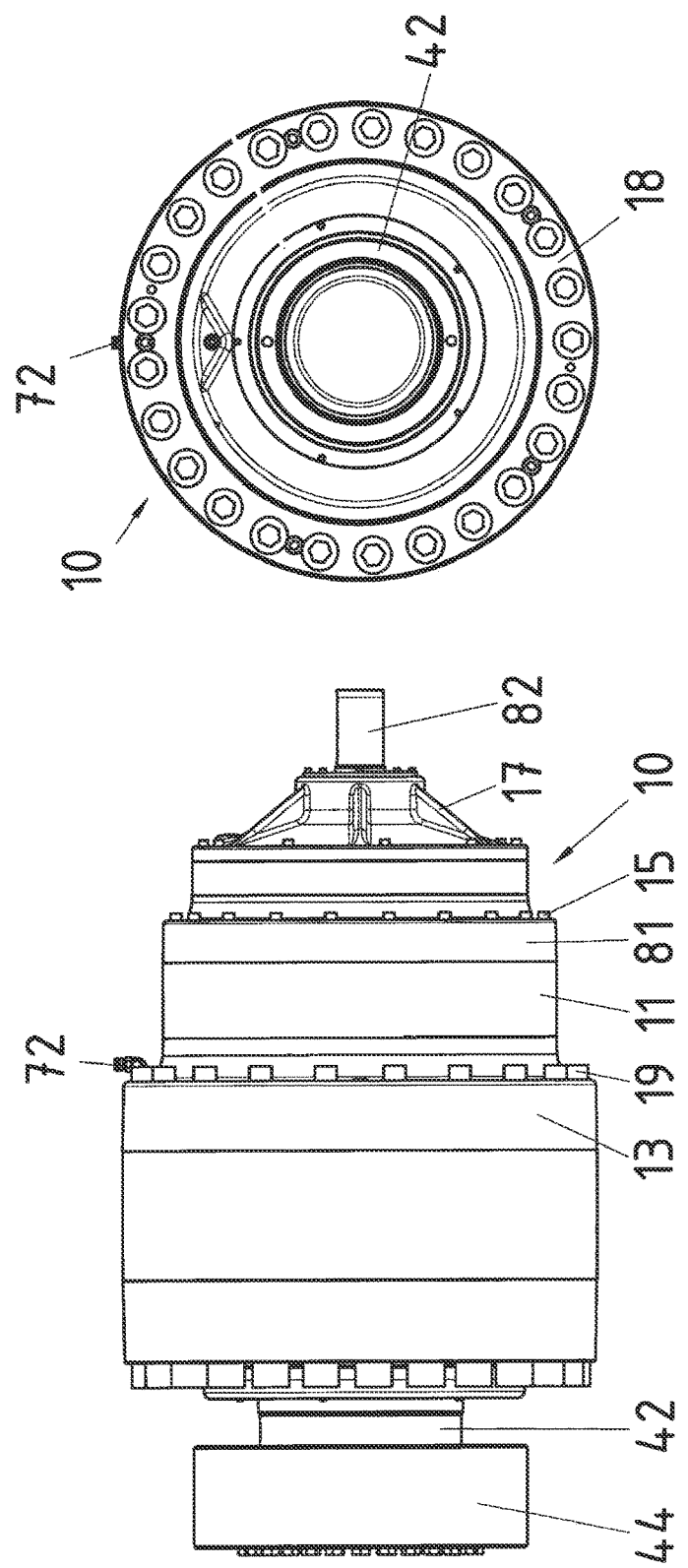
FIG. 3 is a front view and a side view of another example embodiment.
Figure 4:
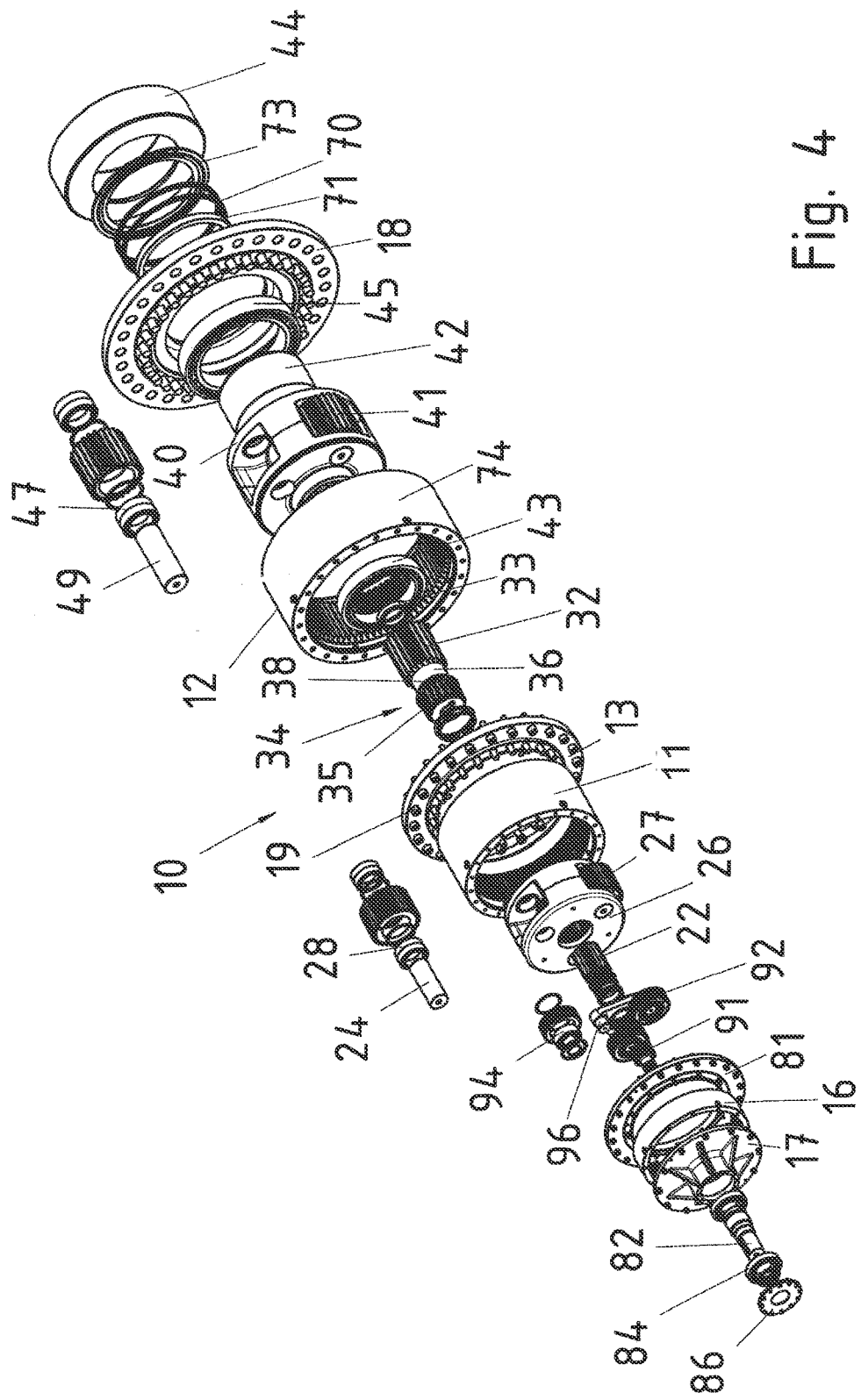
FIG. 4 is an exploded view of another example embodiment.

In the exemplary embodiments shown in FIG. 1, FIG. 2 and FIG. 3, the input flange 81, the intermediate flange 13 and the output cover 18 are preferably made from cast parts. In the exemplary embodiments shown in FIG. 4, FIG. 5 and FIG. 6, the input flange 81, the intermediate flange 13 and the output cover 18 are preferably arranged as forged parts.

An input shaft 82 projects through input cover 17. An end region on the output side is developed to be hollow. The input cover 17 has a central cylinder jacket-shaped bearing carrier and a circular shield part enclosing the bearing carrier. The shield part is reinforced by triangular parts projecting radially from the bearing carrier. The triangular parts are supported on the bearing carrier. Input shaft 82 is supported by an input shaft bearing 84 in the bearing carrier of input cover 17. On the input side, input shaft bearing is covered by a cap 86. Cap 86 has a seal toward input shaft 82.

Input stage 80 of planetary gear 10 is situated in input internal gear 17. An input sun wheel 91 engages with an input-side subregion, which has a multiple spline toothing, into a corresponding opening in input shaft 82. Input sun wheel 91 mates by a toothed region with three input planet wheels 92. Input planet wheels 92 are supported by a planet bearing 94 on planet bolts 96 of an input planet carrier 90 and are engaged with a toothing of input internal gear 16. Input planet carrier 90 is arranged as an approximately equal-sided triangle having a central circular opening. Planet bolt 96 is formed directly from the cast part. A raw cast part for manufacturing input planet carrier 90 has raw bolts projecting axially, which reveal a base area elongated in an oval shape in the radial direction when viewed from the axial perspective. Thus it is possible to provide planet bolts 96 from the raw bolts at varying radial distances to a central axis of planetary gear 10.

Input stage 80 is followed by first stage 20 of planetary gear 10. A second sun wheel 22 of the first stage projects with an end region is arranged as multiple spline toothing into the circular opening of input planet carrier 90. The circular opening has a corresponding multiple spline toothing. A toothed region of second sun wheel 22 mates with a planet wheel 27. Planet wheel 27 is supported on bolt 24 of a planet carrier 26 of first stage 20 via a planet wheel bearing 28 and is engaged with a toothing of first internal gear 11. Planet wheel bearing 28 is axially fixed by respective retaining rings. Bolts 24 are situated in corresponding openings in cheeks of planet carrier 26, which is preferably arranged to have two cheeks. First stage 20 preferably has three planet wheels 27.

A second stage 30 is situated on the output side in the central cylinder jacket-shaped housing part 12. A first sun wheel 32 in principle has a continuously manufactured toothing. The continuously manufactured toothing of first sun wheel 32 is interrupted by a recess in a central region 36 of first sun wheel 32. In this context, interrupted means that no toothing is present at all, that is, that first sun wheel 32 has a—within the limits of manufacturing precision— smooth surface in this central region 36, a diameter of first sun wheel 32 in this central region 36 corresponding at most to the root-circle diameter of the adjacent toothing. In the manufacture, first sun wheel 32 is clamped and the toothing machine guides the cutting tool with an uninterrupted lifting motion over the entire axial length of first sun wheel 32. Because of the recess, less material has to be removed.

An input-side end region 34 of first sun wheel 32 has shortened teeth in a subregion 35, which thus form a reduced crown-circle diameter. With this subregion 35, first sun wheel 32 engages into planet carrier 26 of the first stage. For this purpose, planet carrier 26 of the first stage 20 has a corresponding toothing in a circular opening in the output-side cheek. Centering occurs via the tooth faces. The possible fits are a clearance fit, a transitional fit or a press fit. For example embodiments having a particular low backlash, a cutting fit is possible as well. The shortened crown circle in subregion 35 produces an axial stop 38, on which planet carrier 26 abuts with an output-side end face.

First sun wheel 32 is supported in a two-cheeked planet carrier 40 of the second stage 30 with an output-side end section by a sun wheel bearing 33, which is preferably arranged as a grooved ball bearing. In two-cheeked planet carrier 40, another planet wheel 41 is supported on another bolt 49 via a bolt bearing 47. The additional bolt 49 is held in openings in the cheeks of two-cheeked planet carrier 40. Preferably two double-cylinder roller bearings are provided as bolt bearing 47 between the additional bolt 49 and additional planet wheel 41. Additional planet wheel 41 mates with first sun wheel 32. The toothing of sun wheel 32 is ground only in the region, where first sun wheel 32 mates with additional planet wheel 41. The recess between the non-ground input-side region 34 and the ground region allows for the grinding tool to be more readily guided away from and guided toward first sun wheel 32 in the manufacture.

Figure 8:
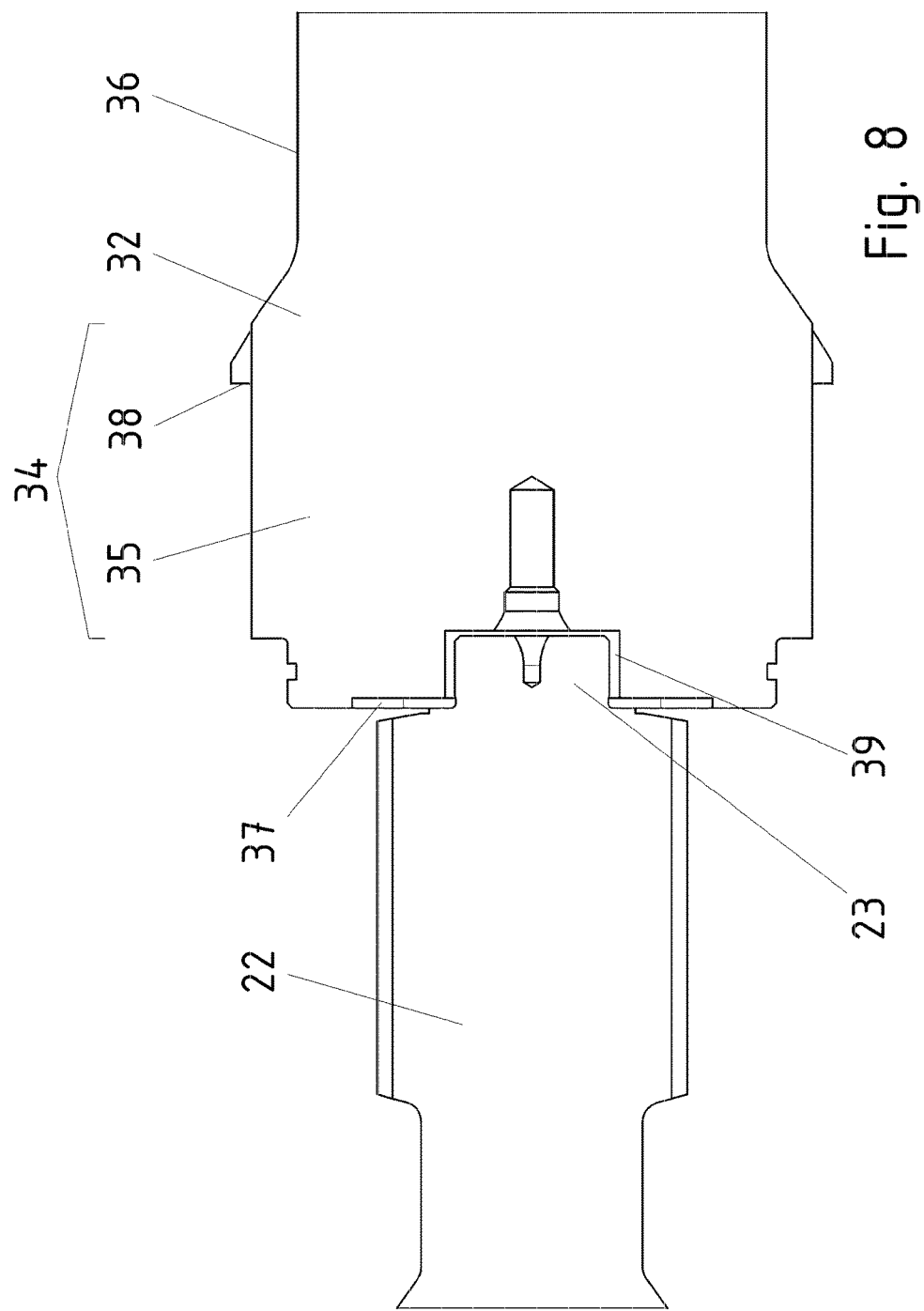
FIG. 8 is a sectional view of the sun wheels shown in FIG. 7.

FIGS. 7 and 8 show details of first sun wheel 32 and second sun wheel 22. First sun wheel 32 and second sun wheel 22 are situated coaxially one behind the other. A hydrodynamic axial bearing is arranged between the mutually facing end faces on account of the different rotational speeds during the operation of the planetary gear.

A first recess 37 is formed, in particular milled, in the end face of first sun wheel 32. As may be seen from FIG. 8, first recess 37 extends beyond the end face of second sun wheel 22. That is to say, the radial outer regions of first recess 37 may be seen when looking from the axial direction from second sun wheel 22. This makes it possible for a lubricant, preferably a lubricating oil or oil, with which planetary gear 10 is at least partly filled, to penetrate first recess 37.

Due to the different rotational speeds of first sun wheel 32 and second sun wheel 22 of planetary gear 10 during the operation of planetary gear 10, the penetrating lubricant is drawn between the mutually facing end faces of first sun wheel 32 and second sun wheel 22 and there forms a lubricating film. This produces a pressure in the axial direction, which forms the hydrodynamic axial bearing.

To secure the formation of a lubricating film between the mutually facing end faces of the two sun wheels, i.e. first sun wheel 32 and second sun wheel 22, a lubricant level is at least at the level of the radial extension of first recess 37.

This ensures that when planetary gear 10 starts up the lubricant is conveyed between the end faces on account of the different rotational speed of the first and the second sun wheel 32, 22.

First recess 37 is preferably situated concentrically to the axis of first sun wheel 32 and arranged in an oval shape. This produces a symmetrical lubricating film, and the hydrodynamic axial bearing is provided more advantageously.

The end face of first sun wheel 32 has another recess 39, which is arranged concentrically to the axis of first sun wheel 32 and in a circular manner. The additional recess 39 extends further into first sun wheel 32 than first recess 37. In two opposite subregions, additional recess 39 extends symmetrically beyond first recess 37. A blind-end bore is produced in a bottom of additional recess 39, which is used to fasten and/or center first sun wheel 32 in a tool.

A pin 23 of the end face of second sun wheel 22 extends at least partly into additional recess 39. Pin 23 protrudes concentrically, centrally from the end face of second sun wheel 22. Pin 23 is used to fasten second sun wheel 22 in a tool. Cutting this pin 23 off is more involved that machining the end face of first sun wheel 32 with another recess 39. Pin 23 additionally supports the arrangement of the hydrodynamic axial bearing as a bank-up step for the lubricant.

Respectively one centering bore is produced in the mutually facing end faces. This is used for centering and/or as an attachment aide for a tool in the manufacture of sun wheels 22, 32. At the same time, these centering bores extend a lubricant reservoir for the hydrodynamic axial bearing.

On the input side, two-cheeked planet carrier 40 is supported by a planet carrier bearing 43 in intermediate flange 13. On the output side, planet carrier 43 is arranged either as a hollow shaft 42 or a solid shaft 46. Solid shaft 46 or hollow shaft 42 protrudes with another end section from output cover 18 and is supported in output cover 18 via an output bearing 45. A shaft sealing ring 70, preferably a double shaft sealing ring, is situated between solid shaft 46 or hollow shaft 42 and output cover 18 for the purpose of sealing. Shaft sealing ring 70 is provided on a race 71 situated on hollow shaft 42. On the output side, shaft sealing ring 70 is covered or protected by a sheet metal part 73. A shrink disk 44 surrounds the further end section of hollow shaft 42 at least partly for the purpose of fastening a device that is to be driven.

A cylinder jacket-shaped cover is attachable to output cover 18 in order to prevent injury. The cylinder jacket-shaped cover is preferably, in particular exclusively, manufactured from bent parts that are screwed together.

An L-shaped foot may be screwed onto output cover 18. The L-shaped foot has an approximately annular subsection and a rectangular frame as a base or fastening surface. The annular subsection includes protuberances, on which the rectangular frame is fastened. Additionally, the approximately annular subsection and the rectangular frame are connected to each other via an angular bracket. An end region of the angular bracket projects through a rectangular slot of a protuberance on the approximately annular subsection. Both parts are preferably welded to each other. This facilitates mounting the L-shaped foot.

The invention claimed is:

1. A planetary gear, comprising:
   at least two sun wheels arranged coaxially one behind the other; and
   a hydrodynamic axial bearing arranged between and in axially pressurized contact with both the sun wheels, wherein a first sun wheel of the sun wheels has a first recess in an end face that extends in a circumferential direction radially further than an end face of a second sun wheel of the sun wheels so that radial outer regions of the first recess may be seen when looking from an axial direction from the second sun wheel.

2. The planetary gear according to claim 1, wherein the hydrodynamic axial bearing is arranged between two mutually facing end faces of the sun wheels.

3. The planetary gear according to claim 1, wherein a centrally arranged pin protrudes beyond the end face of the second sun wheel, which is arranged at least partially in an additional recess of the end face of the first sun wheel.

4. The planetary gear according to claim 3, wherein the additional recess is arranged concentrically to an axis of first sun wheel and is circular shaped, the additional recess extending axially deeper into the first sun wheel than the first recess.

5. The planetary gear according to claim 3, wherein a distance between a front face of the pin and a bottom surface of the additional recess is greater than a distance between mutually facing end faces of the sun wheels.

6. The planetary gear according to claim 1, wherein at least one of (a) a level of a lubricant, with which the planetary gear is at least partially filled, touches at least the first recess and (b) the first recess is immersed in the lubricant.

7. The planetary gear according to claim 1, wherein end faces of the sun wheels include at least one of (a) centering bores and (b) tool receptacles.

8. The planetary gear according to claim 1, wherein the sun wheels are supported axially in a floating manner.

9. The planetary gear according to claim 1, wherein an input-side end region of one of the sun wheels is connected with a corresponding end region of an input shaft or a planetary carrier in a rotationally fixed and form-locking manner.

10. The planetary gear according to claim 1, wherein the planetary gear includes a first stage and a second stage, the first sun wheel being associated with the second stage, engages with an end region as an engaging piece into a planet carrier of the first stage and has a continuously manufactured toothing in an axial direction.

11. The planetary gear according to claim 10, wherein the second stage is arranged as an output stage, a two-cheeked planet carrier of the output stage being arranged on an output side as at least one of (a) a hollow shaft, (b) a hollow shaft enclosed by a shrink disk, (c) a solid shaft, and (d) a solid square shaft.

12. The planetary gear according to claim 10, wherein an input stage is arranged in front of the first stage when viewed from an input side.

13. The planetary gear according to claim 10, wherein the second sun wheel in an input-side end region engages with a multiple spline toothing into an input planet carrier of an input stage.

14. The planetary gear according to claim 10, wherein an input stage and the first stage each have three planet wheels.

15. The planetary gear according to claim 10, wherein the second stage has four additional planet wheels.

16. The planetary gear according to claim 10, wherein at least one of (a) the planet carrier and (b) a two-cheeked planet carrier of the first and second stage are cast as one piece, receiving holes for bolts for planet wheels producible at different radial distances to a central axis of the planetary gear.

17. The planetary gear according to claim 1, wherein the first sun wheel has a central region in which a continuously manufactured toothing is axially interrupted.

18. The planetary gear according to claim 1, wherein an end region has shortened teeth in a subregion and a reduced crown circle diameter, which produces an axial stop, on which a planet carrier of a first stage abuts.

19. The planetary gear according to claim 1, further comprising an intermediate flange, on which a first internal gear and a second internal gear are flange-mounted, arranged as a cast part.

20. The planetary gear according to claim 1, wherein an input cover has a central cylinder jacket-shaped bearing carrier and a circular shield part enclosing the bearing carrier, the shield part reinforced by triangular parts projecting radially from the bearing carrier, and the triangular parts resting on the bearing carrier.

21. The planetary gear according to claim 1, wherein an equal-sided triangular input planet carrier is arranged as a cast part together with planet bolts for bearing input planet wheels of an input stage, the planet bolts manufacturable from the cast part in varying radial distances to a central axis of the planetary gear.

22. The planetary gear according to claim 1, wherein a housing of the planetary gear includes an input-side cover, an input internal gear, an input flange, a first internal gear, an intermediate flange, a second internal gear, and an output cover, the input flange, the intermediate flange, and the output cover each being produced from one of (a) a cast blank and (b) a forged part.

23. The planetary gear according to claim 1, wherein the planetary gear is arranged as a multi-stage planetary gear.

* * * * *